US011062664B2

(12) United States Patent
Li et al.

(10) Patent No.: US 11,062,664 B2
(45) Date of Patent: Jul. 13, 2021

(54) GRAYSCALE ADJUSTMENT METHOD AND DISPLAY DEVICE

(71) Applicants: Beijing BOE Optoelectronics Technology Co., Ltd., Beijing (CN); BOE Technology Group Co., Ltd., Beijing (CN)

(72) Inventors: Pengtao Li, Beijing (CN); Jie Yu, Beijing (CN); Qing Ma, Beijing (CN); Rui Han, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/744,235

(22) Filed: Jan. 16, 2020

(65) Prior Publication Data

US 2020/0273413 A1 Aug. 27, 2020

(30) Foreign Application Priority Data

Feb. 25, 2019 (CN) ........................ 201910143759.8

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.
CPC ..... *G09G 3/3607* (2013.01); *G09G 2310/027* (2013.01)

(58) Field of Classification Search
CPC ........................ G09G 2310/027; G09G 3/3607
See application file for complete search history.

(56) References Cited

U.S. PATENT DOCUMENTS

2017/0229072 A1* 8/2017 Xing .................... G09G 3/3406
2018/0204522 A1* 7/2018 Furihata .............. G09G 3/3275

FOREIGN PATENT DOCUMENTS

CN 101739984 A 6/2010

* cited by examiner

*Primary Examiner* — Insa Sadio
(74) *Attorney, Agent, or Firm* — Fay Sharpe LLP

(57) ABSTRACT

A grayscale adjustment method, including: acquiring a pixel value of a target pixel point in an image to be displayed; determining a target display grayscale value of a target pixel when the backlight source emits light of a first color in the light-emitting cycle based on a current display grayscale value of the target pixel in the display panel, a duration coefficient of the target pixel and a grayscale value of a first-color channel in a plurality of color channels of the target pixel point, wherein the target pixel is configured to display the target pixel point; and adjusting the current display grayscale value of the target pixel to the target display grayscale value when the backlight source emits light of the first color. A grayscale adjustment device and a display device are further disclosed.

19 Claims, 4 Drawing Sheets

10

GRAYSCALE ADJUSTMENT METHOD AND DISPLAY DEVICE

CROSS-REFERENCE TO RELATED APPLICATION

This application claims priority to Chinese Patent Application No. 201910143759.8 filed with the China National Intellectual Property Administration on Feb. 25, 2019 and entitled "GRAYSCALE ADJUSTMENT METHOD AND DEVICE, AND DISPLAY DEVICE", the entire contents of which are incorporated herein by reference.

TECHNICAL FIELD

Embodiments of the present disclosure relate to a grayscale adjustment method and a display device.

BACKGROUND

Generally, a liquid crystal display device comprises a backlight source and a liquid crystal display panel. The liquid crystal display panel comprises a color film. Light emitted by the backlight source turns into colored light after passing through the color film, achieving color display of the liquid crystal display device. Due to low light transmittance of the color film, utilization of light emitted by the backlight source is low.

SUMMARY

At least one embodiment of the present disclosure provides a grayscale adjustment method applicable to a display device, wherein the display device comprises a backlight source and a display panel, the backlight source being configured to alternately emit light of a plurality of colors in one light-emitting cycle, and the method comprises:

acquiring a pixel value of a target pixel point in an image to be displayed, wherein the pixel value has grayscale values of a plurality of color channels corresponding to the plurality of colors respectively, the target pixel point is a pixel point in the image to be displayed, and a target pixel of the display panel is configured to display the target pixel point;

determining a target display grayscale value of the target pixel when the backlight source emits light of a first color in the light-emitting cycle based on a current display grayscale value of the target pixel, a duration coefficient of the target pixel and a grayscale value of a first-color channel in the plurality of color channels of the target pixel point; and adjusting the current display grayscale value of the target pixel to the target display grayscale value when the backlight source emits light of the first color, such that a flux of light of the first color passing through the target pixel in the light-emitting cycle matches the grayscale value of the first color channel of the target pixel point.

At least some embodiments of the present disclosure provide a grayscale adjustment device applicable to a display device, wherein the display device comprises a backlight source and a display panel, the backlight source is configured to alternately emit light of a plurality of colors in a light-emitting cycle; and the grayscale adjustment device comprises:

an acquiring circuit, configured to acquire a pixel value of a target pixel point in an image to be displayed, wherein the pixel value has grayscale values of a plurality of color channels respectively corresponding to the plurality of colors; and the target pixel point is a pixel point in the image to be displayed;

a determining circuit, configured to determine a target display grayscale value of the target pixel when the backlight source emits light of a first color in the light-emitting cycle based on a current display grayscale value of a target pixel in the display panel, a duration coefficient of the target pixel and a grayscale value of a first-color channel in the plurality of color channels of the target pixel point, wherein the target pixel is configured to display the target pixel point; and an adjusting circuit, configured to adjust the current display grayscale value of the target pixel to the target display grayscale value when the backlight source emits light of the first color in the light-emitting cycle, such that the flux of light of the first color passing through the target pixel in the light-emitting cycle matches the grayscale value of the first color channel of the target pixel point.

At least one embodiment of the present disclosure provides a display device, comprising a processor, a memory, a backlight source and a display panel, wherein the backlight source is configured to alternately emit light of a plurality of colors in each light-emitting cycle;

the memory is configured to store a computer program; and the processor is configured to execute the computer program stored in the memory so as to implement the grayscale adjustment method as described above.

At least one embodiment of the present disclosure provides a computer-readable storage medium, wherein an instruction is stored in the computer-readable storage medium; and when the instruction is operated on a processing component, the processing component executes the grayscale adjustment method as described above.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Figure 1:
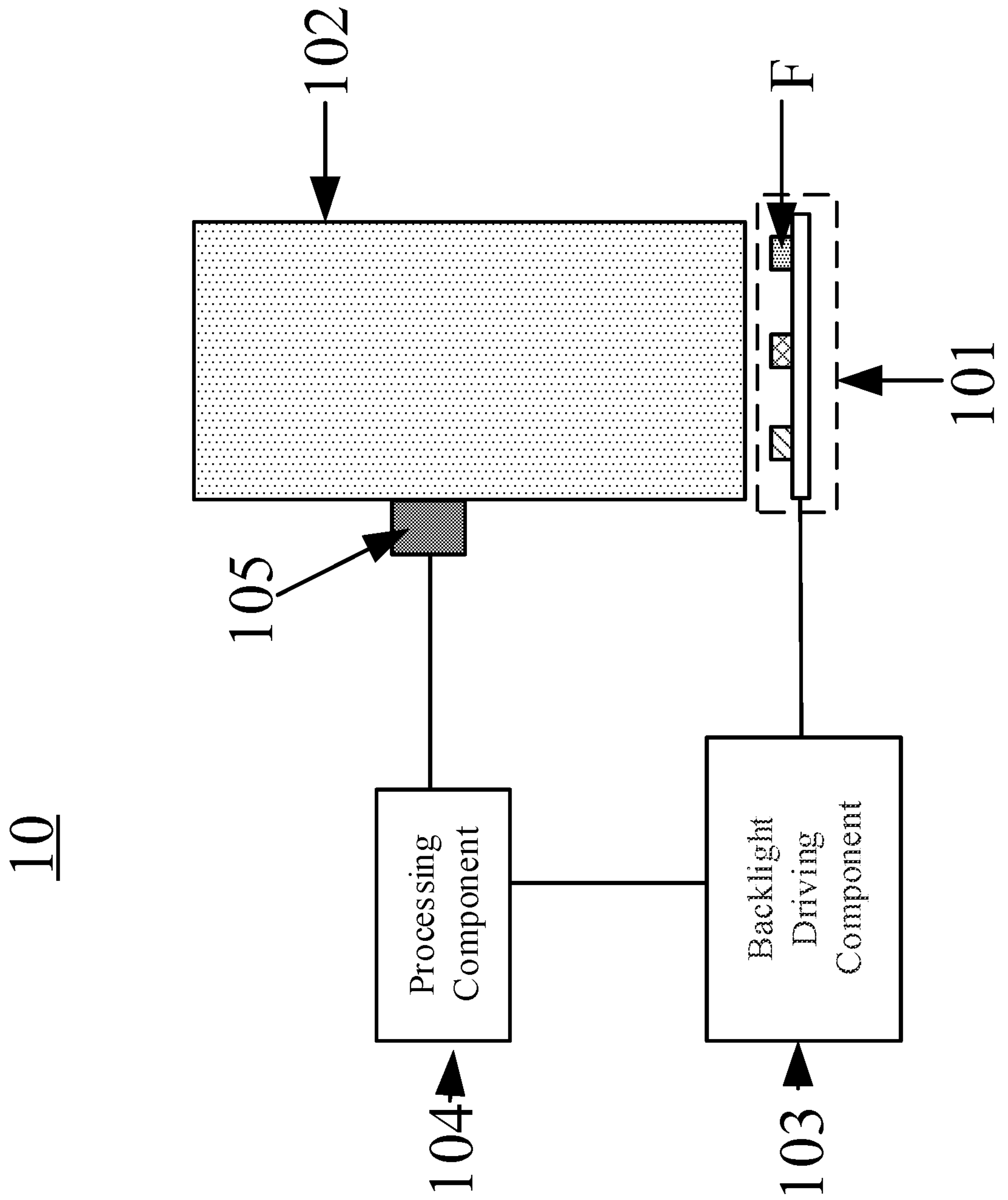
FIG. 1 is a schematic structural diagram of a display device in accordance with an embodiment of the present disclosure.

The present disclosure will be described in further detail with reference to the accompanying drawings, to present the objects, technical solutions, and advantages of the present disclosure more clearly.

The inventors of the present disclosure have known a concept that display of a color image can be achieved without providing a color film in a liquid crystal display device. The liquid crystal display device comprises a backlight source and a liquid crystal display panel. The backlight source alternately emits red light, green light and blue light in a light-emitting cycle. The liquid crystal display panel is located on a light-exiting side of the backlight source and comprises a plurality of pixels arranged in an array. The light-emitting cycle is shorter than a duration of visual persistence of a human eye. The liquid crystal display panel comprises a plurality of pixels arranged in an array. In each light-emitting cycle, the red light, the green light, and the blue light which are alternately emitted by the backlight source sequentially passes through the pixels in the liquid crystal display panel. Due to the persistence of vision, light seen by the human eye is fusion of light of the three colors, which passes through the pixels in the light-emitting cycle.

When a color image needs to be displayed on the liquid crystal display device, a pixel value of each pixel point in the color image is acquired and comprises grayscale values of a red channel, a green channel and a blue channel. When the backlight source emits light of a certain color in a light-emitting cycle, a display grayscale value of a target pixel, corresponding to a target pixel point, in the liquid crystal display panel is adjusted according to the grayscale value of the color channel of the target pixel point, such that the adjusted display grayscale value equals the grayscale value of the color channel. The target pixel point is a pixel point in the image to be displayed. For example, a deflection angle of a liquid crystal molecule in the liquid crystal display panel is adjusted and light transmittance of the pixels are changed to cause the display grayscale value of the target pixel to equal the grayscale value of the target pixel point.

However, since the display grayscale values of the pixels in the liquid crystal display panel can only be adjusted in unit of lines at present, when the backlight source changes light-emitting colors, the display grayscale values of a certain line of pixels in the plurality of lines of pixels of the display panel are simultaneously adjusted to a grayscale value of a color channel corresponding to a current color of light emitted by the backlight source, and the display grayscale values of the pixels in other lines after the above line are still the display grayscale value when the backlight source emits light of the previous color. Exemplarily, it is assumed that the backlight source sequentially emits red light, green light and blue light in the light-emitting cycle, and the target pixel is one of the pixels in other lines than the first line in the display panel (the first line will be the first to be refreshed without being affected by an original display grayscale). Then, in an initial time period after the light-emitting color of the backlight source is switched from red to green, the pixels of the line are not refreshed, and the target pixel still transmits the green light with the previous display grayscale. The previous display grayscale value is a display grayscale value with which the target pixel transmits the red light. The flux of green light passing through the target pixel is less than a required flux of the green light if the previous display grayscale value of the target pixel (namely, the grayscale value of the previous red channel) is smaller than the grayscale value of the current green channel. The flux of green light passing through the target pixel is greater than the required quantity of green light if the display grayscale value of the target pixel (namely, the grayscale value of the previous red channel) is greater than the grayscale value of the current green channel. Furthermore, a ratio of the fluxes of light of all colors passing through the target pixel in the light-emitting cycle is not equal to a ratio of the grayscale values of all the color channels of the target pixel point, resulting in that a color of light fused by light of all the colors passing through the target pixel in the light-emitting cycle is different from that of the target pixel point. Thus, the target pixel cannot accurately display the target pixel point, causing a distortion of an image displayed by the display device.

In a technical solution known by the inventors, in order to solve the above-mentioned problem, every time before the backlight source switches the color of light source color, the display grayscale values of all pixels are adjusted to 0 line by line, such that all the pixels are opaque. After that, the display grayscale values of the pixels are adjusted line by line according to the grayscale value of each color channel corresponding to each pixel. In this way, in one light-emitting cycle, the display grayscale value of each pixel that transmits any color of light always equals the grayscale value of that color channel. Further, each pixel transmits the required quantity of light of each color in the light-emitting cycle. A color of light fused by all light passing through each pixel in the light-emitting cycle is the same as that of the target pixel point.

However, in the technical solution, when the backlight source emits light of respective colors in one light-emitting cycle, it is necessary to adjust the display grayscale value of the pixel twice. Thus, the light-emitting cycle is relatively longer. Since the light-emitting cycle needs to be shorter than the duration of visual persistence of the human eye, in the technical solution, display of the color image without providing the color film in the liquid crystal display device is low in implementability.

At least one embodiment of the present disclosure provides a grayscale adjustment method, which can realize display of the color image by a display device without a color film.

FIG. 1 is a schematic structural diagram of a display device in accordance with one embodiment of the present disclosure. As illustrated in FIG. 1, the display device 10 may comprise a backlight source 101 and a display panel 102. The display panel 102 is located on a light-exiting side of the backlight source 101. The backlight source 101 is configured to alternately emit light of a plurality of colors in a light-emitting cycle. The light-emitting cycle is shorter than a duration of visual persistence of a human eye.

It should be noted that such a visual phenomenon is called "visual persistence" that when the human eye observes things, a light signal will stay for a short period of time after being transmitted into brain nerves, and after light disappears, a visual image will not disappear instantly and will form residual vision. The duration of vision persistence is a duration in which the human eye can retain the image after the image seen by the human eye disappears. Exemplarily, the duration of visual persistence is represented by z, and 0.05 seconds≤z≤0.2 seconds.

Optionally, the display device 100 may further comprise a backlight driving component 103 that can drive the backlight source 101 to emit light. It should be noted that the backlight source 101 of the display device 10 may be a direct-type backlight source or a side-type backlight source, A side-type backlight source as an example is illustrated in FIG. 1. For example, the backlight driving component 103 may be implemented in the form of a circuit. The circuit supplies power for the backlight source and controls the backlight source to alternately emit light of a plurality of colors in a cycle.

Exemplarily, the backlight source 101 may comprise light-emitting units F of a plurality of colors, each of which can emit light of respective colors. For example, as illustrated in FIG. 1, the backlight source can emit light of three colors, namely, red, green and blue. The backlight source comprises a red light-emitting unit, a green light-emitting unit and a blue light-emitting unit. In a light-emitting cycle, the backlight driving component can drive the red light-emitting unit, the green light-emitting unit and the blue light-emitting unit to emit light sequentially. Thus, the backlight source sequentially emits red light, green light and blue light in the light-emitting cycle. It should be understood that the present disclosure does not limit the light-emitting order of the light-emitting units in the backlight source. The light-emitting units of the plurality of colors in the backlight source can emit light in other orders in the light-emitting cycle. For example, the blue light-emitting unit, the green light-emitting unit and the red light-emitting unit emit light sequentially. It should be further understood that the backlight source may comprise light-emitting units of 4, 5 or more colors, which will not be limited by the present embodiment.

In some embodiments of the present disclosure, a refreshing cycle of the display device is an integer multiple of the light-emitting cycle and refers to time required for the display device to refresh one image. Exemplarily, if a refreshing rate of the display device is 50 THz, it means that the display device refreshes 50 images per second, and the refreshing cycle of the display device is 1/50 seconds. In some embodiments of the present disclosure, the refreshing cycle of the display device equals the light-emitting cycle. At this time, the light-emitting cycle is also 1/50 seconds.

Continuously referring to FIG. 1. In some embodiments of the present disclosure, the display device 10 may further comprise a processing component 104 with a processing function. The processing component 104 may be configured as a central processor of the display device. The processing component 104 may be implemented as a circuit, implemented by an FPGA (Field-Programmable Gate Array), or implemented as a special chip, or can be multiplexed with processing components of other apparatuses, which will not be limited by the embodiments of the present disclosure.

In some embodiments of the present disclosure, the backlight driving component 103 may be connected to the backlight source 101 and the processing component 104. The processing component 104 may drive the backlight source 101 to emit light in a light-emitting order through the backlight driving component 103. The processing component 104 may also be connected to the display panel 102 to adjust light transmittance of each pixel in the display panel 102. In some embodiments of the present disclosure, continuously referring to FIG. 1, the display device 10 may further comprise a display panel driving component 105, which may be connected to the display panel 102 and the processing component 104, respectively. The processing component 104 may adjust light transmittance of each pixel in the display panel 102 through the display panel driving component 105 so as to adjust a display grayscale value of respective pixels. In some embodiments of the present disclosure, the display panel driving component 105 may comprise a source driver IC (Integrated Circuit) chip. In some embodiments of the present disclosure, the backlight driving component 103 and the display panel driving component 105 may be integrated in a same driving component, which will not be limited by the embodiments of the present disclosure.

In some embodiments of the present disclosure, after the display device is powered on, initial display grayscale values of all pixels in the display panel may be one of 0 and 255. That is, the display panel displays an all-black picture (corresponding to the initial display grayscale value 0) or an all-white picture (corresponding to the initial display grayscale value 255) before displaying a first frame image. Optionally, each pixel may have other initial display grayscale values, which will not be limited by the embodiments of the present disclosure.

In the above-mentioned embodiments of the present disclosure, the processing component and the backlight driving component may be implemented in the form of circuit, or software, or a combination of circuit and software, which will not be limited by the embodiments of the present disclosure.

Figure 2:
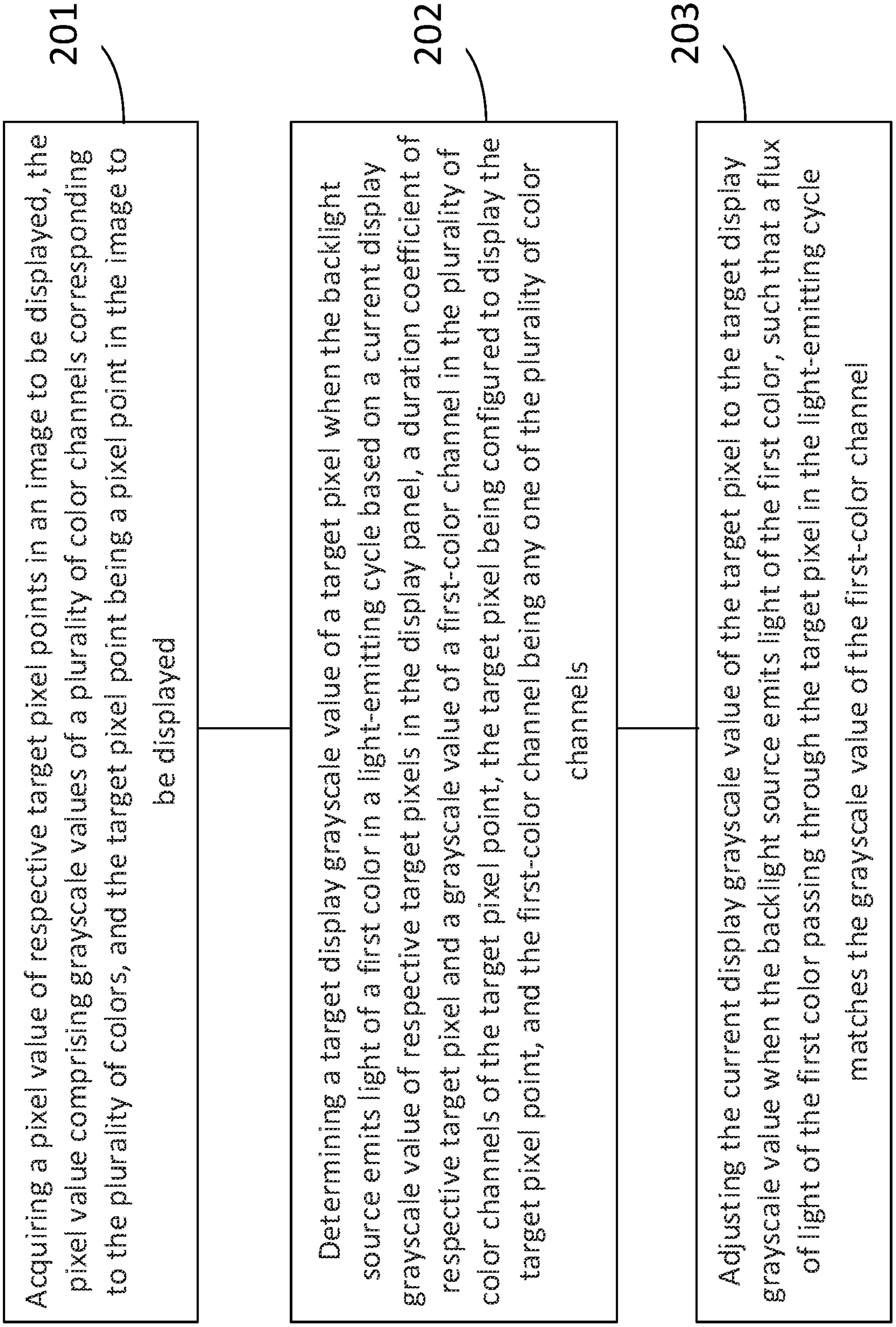
FIG. 2 is a flow chart of a grayscale adjustment method in accordance with an embodiment of the present disclosure.

FIG. 2 is a flow chart of a grayscale adjustment method in accordance with an embodiment of the present disclosure. The grayscale adjustment method is applicable to a display device illustrated in FIG. 1. The display device may comprise a backlight source and a display panel located on a light-exiting side of the backlight source. The backlight source is configured to alternately emit light of a plurality of colors in a light-emitting cycle. In some embodiments of the present disclosure, the method can be executed by the processing component 104 illustrated in FIG. 1.

As illustrated in FIG. 2, the method may comprise the following steps.

In step 201, a pixel value of respective target pixel points in an image to be displayed is acquired. The pixel value comprises grayscale values of a plurality of color channels corresponding to the plurality of colors. The target pixel point is a pixel point in the image to be displayed.

In step 202, a target display grayscale value of a target pixel when the backlight source emits light of a first color in a light-emitting cycle is determined based on a current display grayscale value of respective target pixels in the display panel, a duration coefficient of respective target pixel and a grayscale value of a first-color channel in the plurality of color channels of the target pixel point. The target pixel is configured to display the target pixel point. The first-color channel is any one of the plurality of color channels.

The duration coefficient is in positive correlation with a duration in which the target pixel displays the first color with the current display grayscale value in the light-emitting cycle.

In step 203, the current display grayscale value of the target pixel is adjusted to the target display grayscale value when the backlight source emits light of the first color, such that a flux of light of the first color passing through the target pixel in the light-emitting cycle matches the grayscale value of the first-color channel.

In summary, in the grayscale adjustment method provided by the present embodiment, the target display grayscale value can be determined based on the current display grayscale value, the duration coefficient of the target pixel and the grayscale value of the first-color channel of the target pixel point. When the backlight source emits light of the first color in the light-emitting cycle, the flux of light of the first color passing through the target pixel in the light-emitting cycle can match the grayscale value of the first-color channel so long as the current display grayscale value of the target pixel is adjusted to the target display grayscale value. Further, the display device can display the color image. Since the display grayscale value of respective pixels only needs to be adjusted once when the backlight source emits light of one color during the display device displaying the color image, the light-emitting cycle can be shortened. Further, displaying color image by the display device is improved in implementability.

In step 201, the pixel value comprises grayscale values of a plurality of color channels. Further, by emitting light of a plurality of colors in a light-emitting cycle, the backlight source can correspondingly display the grayscale values of the plurality of color channels of the pixel points in the image to be displayed.

The present embodiment is described by taking that the backlight source can emit light of three colors, namely, red, green and blue, as an example. At this time, the pixel value of the target pixel point comprises a grayscale of a red channel, a grayscale of a green channel and a grayscale of a blue channel. Exemplarily, the pixel value (R, G, B) of the target pixel point is (100, 150, 200). That is, the grayscale value of the target pixel point corresponding to red is 100, the grayscale value corresponding to green is 150 and the grayscale value corresponding to blue is 200.

In step 202, the first color is any of the plurality of colors of the target pixel point.

Implementation of step 202 will be described in the followings.

In S2021, the current display grayscale value and the duration coefficient of the target pixel are acquired.

The current display grayscale value and the duration coefficient of the target pixel will be explained in the following embodiments of the present disclosure respectively.

The current display grayscale value of the target pixel is a display grayscale value of the target pixel not refreshed. Since the backlight source sequentially emits light of respective colors in each light-emitting cycle, when the backlight source emits light of the first color, the current display grayscale value of the target pixel can be the target display grayscale value of the target pixel when the backlight source emits light of a previous color. If light of the first color is a light of the first color (e.g., red light) emitted by the backlight source after powers on, the current display grayscale value of the target pixel may be the initial display grayscale value. For example, the current display grayscale value of the target pixel may be one of 0 and 255. In some embodiments of the present disclosure, when light of the first color is a light of the first color emitted by the backlight source after power on, the current display grayscale value of the target pixel may be other grayscale values, which will not be limited by the embodiments of the present disclosure.

Exemplarily, the backlight source sequentially emits red light, green light and blue light in each light-emitting cycle, and the display panel displays one frame image in each light-emitting cycle, if the backlight source currently emits light of the first color (e.g., green light, i.e., the first color is green), since the display panel performs refreshing in unit of lines, for example, when the display panel starts to sequentially refresh the first line of target pixels, the target display grayscale value of the first color (green) is displayed after the first line of target pixels are refreshed, the target pixels in the second to $m^{th}$ lines are not refreshed during refreshing the first line, and the current display grayscale values of the target pixels in these lines are still a target display grayscale value of the target pixel when the backlight source emits red light. Similarly, if the backlight source currently emits blue light, the current display grayscale value of the target pixel may be a target display grayscale value of the target pixel when the backlight source emits green light. If the backlight source currently emits red light, the current display grayscale value of the target pixel may be a target display grayscale value of the target pixel when the backlight source emits blue light in the previous light-emitting cycle (that is, when the display panel displays the previous frame image of the image to be displayed).

Regarding the duration coefficient of the target pixel, the duration coefficient is in positive correlation with a duration in which the target pixel displays the first color with the current display grayscale value in the light-emitting cycle. The duration coefficient equals a ratio of a duration in which the target pixel displays the first color with the current display grayscale value in the light-emitting cycle to a total duration in which the backlight source emits light of the first color in the light-emitting cycle. The duration in which the target pixel displays the first color with the current display grayscale value in the light-emitting cycle is correlated with a location of the target pixel on the display panel or a distance from the target pixel to the first line of pixels. For example, if the display panel performs refreshing line by line from left to right, the closer the target pixel on the display panel is to the left side, the shorter the duration in which the target pixel displays the first color with the current display grayscale in the light-emitting cycle is. For example, the first line of pixels is refreshed first, and display may be directly performed with the target display grayscale value rather than the current grayscale value without being interfered by the previous display grayscale value. However, for other target pixels, they need to wait for a period of time to be refreshed, and their waiting time is related to the distances away from the first line of pixels.

For example, it is assumed that the display panel comprises m lines of pixels, in is an integer greater than 1, the target pixel is any of the $i^{th}$ line of pixels, i is an integer, and $1 \leq i \leq m$. The time at which display grayscale values of the first line of pixels are adjusted is the same as the time at which the backlight source starts to emit light of the first color. That is, the first line of pixels display with the target grayscale value at the start of the light-emitting cycle without waiting. The duration coefficient of the first line of pixels is 0.

Optionally, when $2 \leq i \leq m$, since all pixels in the display panel display the first color when the backlight source emits light of the first color, and the display grayscale values of the pixels in the display panel are adjusted line by line, target pixels in the line i display the light of first color with the current display grayscale values during the process in which the backlight source emits light of the first color and adjusts the display grayscale values of the first (i−1) lines of pixels in the display panel, a total duration in which the display grayscale values of the first (i−1) lines of pixels are adjusted is a duration in which the target pixel displays the first color with the current display grayscale value. Thus, the duration coefficient may equal a ratio of the total duration in which the display grayscale values of the first (i−1) lines of pixels in the display panel are adjusted to a time interval of two adjustments of the display grayscale values of the first line of pixels, or may equal a ratio of a total duration (or waiting time for refreshing the $i^{th}$ line of pixels) in which the display grayscale values of the first (i−1) lines of pixels in the display panel are adjusted to the light-emitting cycle.

Optionally, the processing component may determine the duration coefficient A of the target pixel according to the following formula (1). That is, the duration coefficient A satisfies the formula (1) as below:

$$A = \frac{i-1}{m+a}, \tag{1}$$

in which a equals a ratio of a first time interval to a second time interval, the first time interval equals a time interval from the end of adjusting display grayscale values of the $m^{th}$ line of pixels when the backlight source emits light of the first color in one light-emitting cycle to a start of adjusting display grayscale values of the first line of pixels when the backlight source emits light of the next color, the second time interval equals a time interval between adjusting display grayscale values of two adjacent lines of pixels (namely, a time interval between adjusting of display grayscale values of the $i^{th}$ line of pixels and adjustment of display grayscale values of the $(i+1)^{th}$ line of pixels), and a≥0. Optionally, the first time interval equals a frame blanking duration of image display by the display panel.

If a=0, that is, the time interval from an end of adjusting display grayscale values of the $m^{th}$ line of pixels when the backlight source emits light of the first color to a start of adjusting display grayscale values of the first line of pixels when the backlight source emits light of the next color is zero, then, a duration in which the backlight source emits light of the first color in one light-emitting cycle equals a duration in which the display gray scale values of all the pixels in the display panel are adjusted. Upon adjustment of the display grayscale values of the re line of pixels ends, the backlight source emits light of the next color, and the processing component starts to adjust the display grayscale values of the first line of pixels.

If a>0, the duration in which the backlight source emits light of the first color in one light-emitting cycle is greater than the duration in which the display grayscale values of all the pixels in the display panel are adjusted. After adjustment of the display grayscale values of the $m^{th}$ line of pixels ends, all the pixels in the display panel can display the first color for a period of time with the adjusted display grayscale values. The length of this period of time is equivalent to the duration in which the display grayscale values of a line of pixels are adjusted.

It should be noted that the present embodiment is described only by taking that the processing component determines the duration coefficient according to the formula (1) as an example. Optionally, the duration coefficient may be determined in other ways. For example, the processing component may record, in real time, the duration in which the display grayscale values of the first (i−1) lines of pixels are adjusted, and the time interval between two adjacent adjustments of the display grayscale values of the first line of pixels, which will not be limited by the present embodiment.

In S2022, the processing component determines, based on the acquired duration coefficient, current display grayscale value and grayscale value of the first-color channel, the target display grayscale value of the target pixel when the backlight source emits light of the first color in the light-emitting cycle.

Optionally, the processing component determines a target display grayscale value of the target pixel based on a specified formula. The specified formula is:

$$M = \frac{F - C*A}{1 - A},$$

in which M is the target display grayscale value, F is the grayscale value of the first-color channel, C is the current display grayscale value and A is the duration coefficient.

Optionally, when the target display grayscale value calculated based on the specified formula is a decimal, the decimal may be rounded off to obtain a non-negative integer, and the obtained non-negative integer is determined as the target display grayscale value of the target pixel when the backlight source emits light of the first color in the light-emitting cycle.

The specified formula may be derived from the following formula (2):

$$S=C*A+M*(1-A),$$

in which S is an actual display grayscale value that matches an actual light transmitting flux of the target pixel during a process in which the backlight source emits light of the first color in the light-emitting cycle. The actual display grayscale value is an equivalent display grayscale value of the target pixel during the process in which the backlight source emits light of the first color in the light-emitting cycle.

It is assumed that the target pixels are pixels in other lines other than the first line in the display panel. The target pixel still transmits light with the previous display grayscale value (e.g., the current display grayscale value C) in an initial time period in which the backlight source emits light of the first color in one light-emitting cycle. After adjustment of the display grayscale value of the target pixel, the other pixels transmit light with the adjusted display grayscale value (e.g, the target display grayscale value M). The flux of light of the first color passing through the target pixel is the actual light transmitting flux. During the process in which the backlight source emits light of the first color in the light-emitting cycle, if the display grayscale value of the target pixel is always the actual display grayscale value, the flux of light of the first color passing through the target pixel is also the actual light transmitting flux.

It should be noted that when the actual display grayscale value S equals the grayscale value F of the first-color channel, the flux of light of the first color actually passing through the target pixel in the light-emitting cycle matches the grayscale value F of the first-color channel. That is, the flux of light of the first color actually passing through the target pixel in the light-emitting cycle equals the flux of light of the first color required for display of the target pixel point. Further, the target pixel can display the target pixel point.

Given S=F, the specified formula may be derived from the formula (2). Further, the target display grayscale value of the target pixel when the backlight source emits light of the first color in the light-emitting cycle may be calculated based on the specified formula.

Exemplarily, it is assumed that m=1,000 and i=101. That is, the display panel comprises 1,000 lines of pixels, and the target pixel is one of the $101^{st}$ line of pixels. The pixel value (R, G, B) of the target pixel point required to be displayed by the target pixel in the image to be displayed is (100, 150, 200), and a=0. That is, a frame blanking duration in which the display panel displays images is 0. Then, the processing component may determine, based on the formula (1), that the duration coefficient A=(101−1)/1,000=0.1. It is further assumed that the backlight source sequentially emits red light, green light the blue light in the light-emitting cycle, the image to be displayed is a first frame image displayed after the display device is powered on, and the current grayscale values of all the pixels in the display panel during display of the first frame image are the initial display grayscale value (e.g., 255). Then, during a process in which the display device displays the image to be displayed, the processing component can determine, based on the specified formula, the target grayscale value $$M = \frac{100 - 255 * 0.1}{1 - 0.1} \approx 83$$

of the target pixel when the backlight source emits red light, the target grayscale value $$M = \frac{150 - 83 * 0.1}{1 - 0.1} \approx 157$$

of the target pixel when the backlight source emits green light, and the target grayscale value $$M = \frac{200 - 157 * 0.1}{1 - 0.1} \approx 205$$

of the target pixel when the backlight source emits blue light.

In step 203, since the light-emitting cycle in the present embodiment is shorter than the duration of visual persistence of the human eye, a color displayed by the target pixel and seen by the human eye is a color of light mixed by all light passing through the target pixel in the light-emitting cycle.

It should be noted that when a ratio of the flux of light of the respective colors actually passing through the target pixel in the light-emitting cycle equals a ratio of the grayscale values of the respective color channels of the target pixel point, the flux of light of the respective colors matches the grayscale value of the color channel. Since the first color is the color of any of the light of a plurality colors emitted by the backlight source, when the current display grayscale value of the target pixel is adjusted to the target display grayscale value, the flux of light of the first color actually passing through the target pixel in the light-emitting cycle matches the grayscale value of the first-color channel. Further, the flux of light of the respective colors actually passing through the target pixel in the light-emitting cycle matches the grayscale value of the color channel. Thus, the flux of light of the respective colors actually passing through the target pixel in the light-emitting cycle equals the flux of light of the color required for display of the target pixel point. Further, the color of light mixed by all the light passing through the target pixel in the light-emitting cycle is the same as the color of the target pixel point. The target pixel can accurately display the target pixel point.

Exemplarily, continuously referring to the example in step 202, when the backlight source emits red light in the light-emitting cycle, the processing component may adjust the target display grayscale value (namely, 255) of the target pixel to 83; when the backlight source emits green light in the light-emitting cycle, the processing component may adjust the target display grayscale value (namely, 83) of the target pixel to 157; and when the backlight source emits blue light in the light-emitting cycle, the processing component may adjust the target display grayscale value namely, 157) of the target pixel to 205.

It should be noted that in the art known by the inventors, each pixel comprises at least three sub-pixels of different colors arranged in sequence, the light transmittance of each sub-pixel needs to be adjusted by a thin film transistor (TFT) in the sub-pixel, and each TFT needs to be connected to a source driver IC chip through a data line. Exemplarily, if the display panel has a resolution ratio of 1080*1.920, the display panel comprises sub-pixels arranged in 1080 lines and 1920*3 columns. There are at least 1080*1920*3 TFTs in the display panel. Since the TFTs are not transparent, and there are too many TFTs in the display panel, a maximum light transmittance of the display panel is relatively lower. Since each column of sub-pixels needs to be connected to a data line, the display panel at least comprises 1920*3 data lines and is complicated in wiring. Due to a limited number of data lines that can be connected to a conventional IC chip, each conventional IC chip can be connected to 1092 data lines. The display panel needs to comprise three IC chips. Too many IC chips are required for image display of the display panel.

In the present embodiment, the backlight source alternately emits light of different colors such that each pixel displays different colors. Therefore, the pixel does not need to comprise a sub-pixel. One pixel only needs to comprise one TFT. Exemplarily, if the display panel has a resolution ratio of 1080*1920, only 1920 TFTs need to be present in the display panel, and the display panel only needs to comprise 1920 data lines and one IC chip. Thus, the display panel has a high maximum light transmittance, is simple in wiring and requires a small number of IC chips for image display.

In summary, in the gray scale adjustment method provided by the embodiments of the present disclosure, the target display grayscale value can be determined based on the current display gray scale value, the duration coefficient of the target pixel and the grayscale value of the first-color channel of the target pixel point. When the backlight source emits light of the first color in the light-emitting cycle, the flux of light of the first color passing through the target pixel in the light-emitting cycle can match the grayscale value of the first-color channel so long as the current display grayscale value of the target pixel is adjusted to the target display grayscale value, such that the display device can display the color image. Since the display grayscale value of each pixel only needs to be adjusted once when the backlight source emits light of one color during a process in which the display device displays the color image, the light-emitting cycle can be shortened with respect to the art known by the inventors. Further, display of the color image by the display device is improved in implementability.

Figure 3:
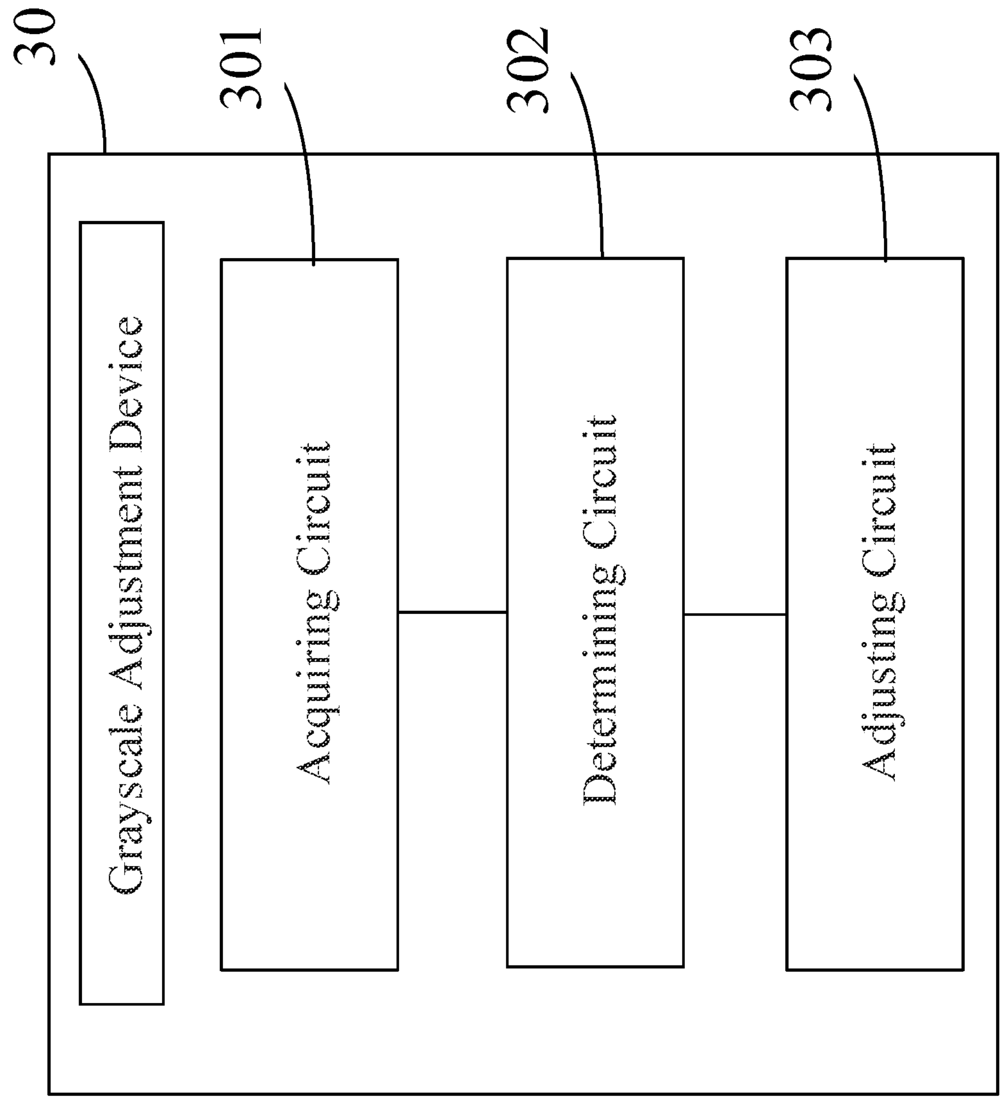
FIG. 3 is a schematic structural diagram of a grayscale adjustment device in accordance with an embodiment of the present disclosure.

FIG. 3 is a schematic structural diagram of a grayscale adjustment device in accordance with one embodiment of the present disclosure. The grayscale adjustment circuit may be applicable to the display device illustrated in FIG. 1. The display device comprises the backlight source and the display panel. The backlight source is configured to alternately emit light of a plurality of colors in each light-emitting cycle, and the display is disposed on a light-emitting side of the backlight source.

As illustrated in FIG. 3, the grayscale adjustment device may comprise:

an acquiring circuit 301, configured to acquire a pixel value of a target pixel point in an image to be displayed, wherein the pixel value comprises grayscale values of a plurality of color channels, the plurality of color channels are in one-to-one correspondence to the plurality of colors, and the target pixel point is any pixel point in the image to be displayed;

a determining circuit 302, configured to determine a target display grayscale value of a target pixel when the backlight source emits light of a first color in the light-emitting cycle based on a current display grayscale value of the target pixel in the display panel, a duration coefficient of the target pixel and a grayscale value of a first color channel in the plurality of color channels, wherein the target pixel is configured to display the target pixel point; the first color channel is any of the plurality of color channels; and the first color corresponds to the first color channel;

an adjusting circuit 303, configured to adjust the current display grayscale value of the target pixel to the target display grayscale value when the backlight source emits light of the first color in the light-emitting cycle, such that the flux of light of the first color passing through the target pixel in the light-emitting cycle matches the grayscale value of the first-color channel.

The duration coefficient is in positive correlation with a duration in which the target pixel displays the first color with the current display grayscale value in the light-emitting cycle.

In summary, in the grayscale adjustment device provided by the present embodiment, the determining circuit can determine, based on the current display grayscale value, the duration coefficient of the target pixel and the grayscale value of the first-color channel of the target pixel point. When the backlight source emits light of the first color in the light-emitting cycle, the flux of light of the first color passing through the target pixel in the light-emitting cycle can match the grayscale value of the first-color channel so long as the current display grayscale value of the target pixel is adjusted to the target display grayscale value. Further, the display device can display the color image. Since the display grayscale value of each pixel only needs to be adjusted once when the backlight source emits light of one color during a process in which the display device displays a color image the light-emitting cycle can be shortened with respect to the art known by the inventors. Further, display of the color image by the display device is improved in implementability.

Optionally, the determining circuit 302 may be configured to determine, based on a specified formula, a target display grayscale value of the target pixel when the backlight source emits light of the first color in the light-emitting cycle. The specified formula is:

$$M = \frac{F - C*A}{1 - A},$$

in which M is the target display grayscale value, F is the grayscale value of the first-color channel, C is the current display grayscale value, A is the duration coefficient, the duration coefficient equals a ratio of a duration in which the target pixel displays the first color with the current display grayscale value in the light-emitting cycle to a total duration in which the backlight source emits light of the first color in the light-emitting cycle.

In some embodiments of the present disclosure, the display panel comprises m lines of pixels; m is an integer greater than 1; the target pixel is any pixel of the $i^{th}$ line of pixels; i is an integer; 1≤i≤m; the time at which display grayscale values of the first line of pixels are adjusted is the same as the time at which the backlight source starts to emit light of the first color; and the duration coefficient A satisfies the following formula:

$$A = \frac{i - 1}{m + a},$$

in which a equals a ratio of a first time interval to a second time interval, the first time interval equals to a time interval from the end of adjusting display grayscale values of the $m^{th}$ line of pixels when the backlight source emits light of the first color in one light-emitting cycle to the start of adjusting display grayscale values of the first, line of pixels when the backlight source emits light of the next color, the second time interval equals to a time interval between adjusting display grayscale values of two adjacent lines of pixels (namely, a time interval between adjusting display grayscale values of the $i^{th}$ line of pixels and adjustment of display grayscale values of the $(i+1)^{th}$ line of pixels), and a≥0. Optionally, the first time interval equals a frame blanking duration of image display by the display panel.

If a=0, that is, the time interval from the end of adjusting display grayscale values of the $m^{th}$ line of pixels when the backlight source emits light of the first color to the start of adjusting display grayscale values of the first line of pixels when the backlight source emits light of the next color is zero. Then, a duration in which the backlight source emits light of the first color in one light-emitting cycle equals a duration in which the display gray scale values of all the pixels in the display panel are adjusted. After adjustment of the display grayscale values of the $m^{th}$ line of pixels ends, the backlight source emits light of the next color, and the processing component starts to adjust the display grayscale values of the first line of pixels.

In some embodiments of the present disclosure, n=3; the n colors comprise red, green and blue; and the backlight source comprises a red light-emitting unit, a green light-emitting unit and a blue light-emitting unit which emit light sequentially in each light-emitting cycle.

In some embodiments of the present disclosure, a refreshing cycle of the display device is an integer multiple of the light-emitting cycle.

In some embodiments of the present disclosure, after the display device is powered on, an initial display grayscale value of the target pixel is one of 0 and 255.

In the above-mentioned embodiments, the acquiring circuit, the determining circuit and the adjusting circuit are described in the form of circuit. Certainly, functions of the acquiring circuit, the determining circuit and the adjusting circuit may also be achieved in the form of software or a combination of circuit and software.

In summary, in the grayscale adjustment devices provided by the embodiments of the present disclosure, the determining circuit can determine, based on the current display grayscale value, the duration coefficient of the target pixel and the grayscale value of the first-color channel of the target pixel point, a target display grayscale value. When the backlight source emits light of the first color in the light-emitting cycle, the flux of light of the first color passing through the target pixel in the light-emitting cycle can match the grayscale value of the first-color channel so long as the current display grayscale value of the target pixel is adjusted to the target display grayscale value. Further, the display device can display the color image. Since the display grayscale value of each pixel only needs to be adjusted once when the backlight source emits light of one color during a process in which the display device displays a color image, the light-emitting cycle can be shortened. Further, display of the color image by the display device is improved in implementability.

Figure 4:
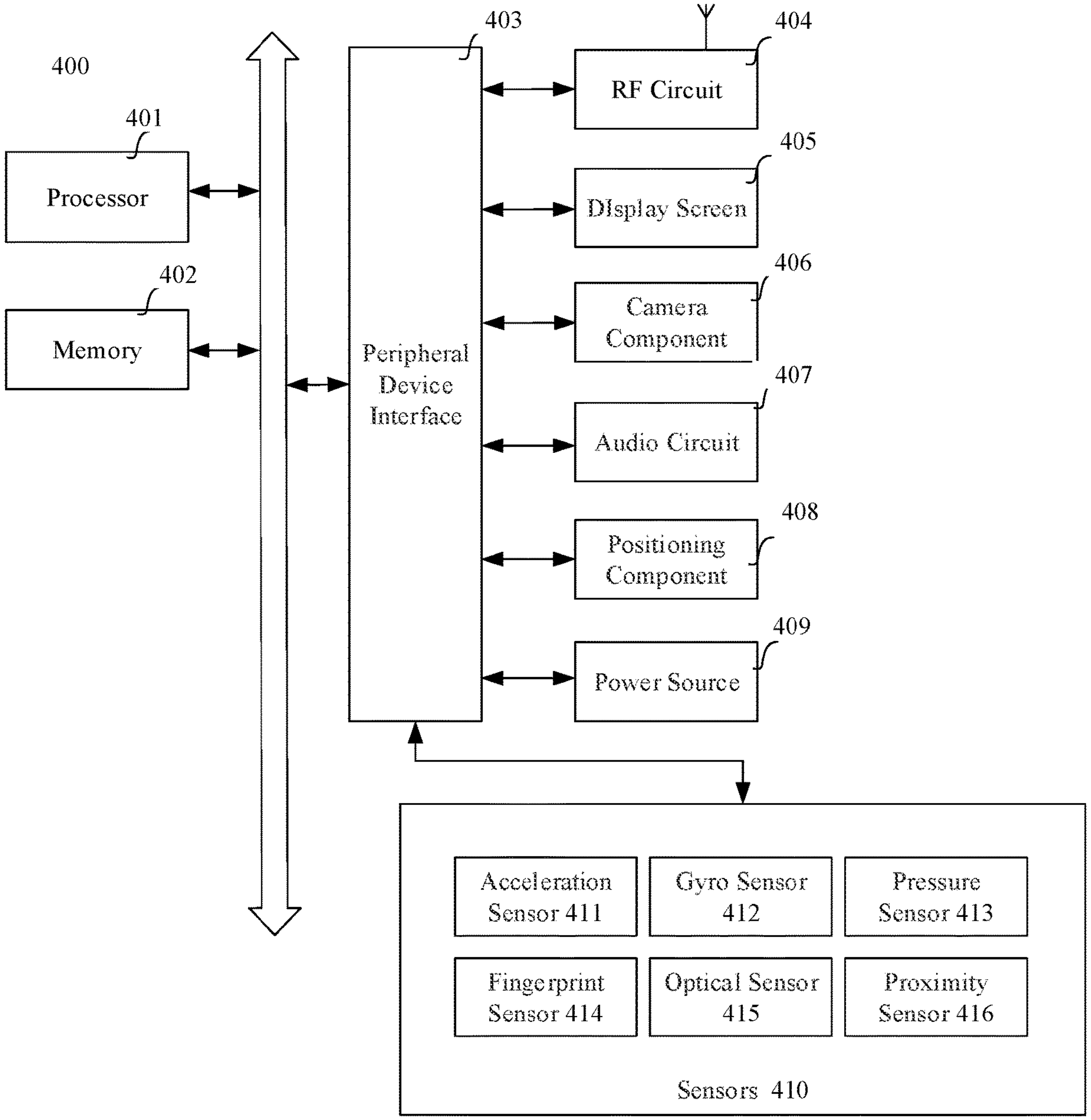
FIG. 4 is a block diagram of a display device in accordance with an embodiment of the present disclosure.

FIG. 4 is a block diagram of a display device in accordance with an embodiment of the present disclosure. The display device 400 may be a portable mobile display device such as a smart phone, a tablet PC, an MP3 (Moving Picture Experts Group Audio Layer III) player, an MIN (Moving Picture Experts Group Audio Layer IV) player, a laptop or a desk computer. The display device 400 may also be called a UE (User Equipment), a portable display device, a laptop display device, a desk display device, etc.

Typically, the display device 400 comprises a processor 401, a memory 402 and a display screen 405. The display screen 405 comprises a backlight source and a display panel. The backlight source is configured to alternately emit light of a plurality of colors in each light-emitting cycle. Exemplarily, with reference to FIG. 1 and FIG. 4, the processor 401 in FIG. 4 may be the same component as the processing component 104 in FIG. 1, and the display screen 405 in FIG. 4 may comprise the backlight source 101 and the display panel 102 in FIG. 1.

The processor 401 may comprise one or more processing cores, such as a 4-core processor and an 8-core processor. The processor 401 may be formed by at least one hardware of a DSP (Digital Signal Processing), an FPGA (Field-Programmable Gate Array), and a PLA (Programmable Logic Array). The processor 401 may also comprise a main processor and a coprocessor. The main processor is a processor configured to process the data in an awaking state, and is also called a CPU (Central Processing Unit). The coprocessor is a low-power-consumption processor configured to process the data in a standby state. In some embodiments, the processor 401 may be integrated with a GPU (Graphics Processing Unit), which is configured to render and draw content that needs to be displayed by a display screen. In some embodiments, the processor 401 may also comprise an AI (Artificial Intelligence) processor configured to process computational operations related to machine learning.

The memory 402 may comprise one or more computer-readable storage mediums, which can be non-transitory. The memory 402 may also comprise a high-speed random access memory, as well as a non-volatile memory, such as one or more disk storage devices and flash storage devices. In some embodiments, a non-transitory computer-readable storage medium in the memory 402 is configured to store at least one instruction. The at least one instruction is executable by the processor 401 to implement the grayscale adjustment method provided by the method embodiments of the present disclosure.

In some embodiments, the device 500 further optionally comprises a peripheral device interface 403 and at least one peripheral device. The processor 401, the memory 402, and the peripheral device interface 403 may be connected by a bus or a signal line. Respective peripheral devices may be connected to the peripheral device interface 403 by a bus, a signal line or a circuit board. For example, the peripheral device comprises at least one of a radio frequency circuit 404, a camera 406, an audio circuit 407, a positioning component 408 and a power source 409. In some embodiments of the present disclosure, the display screen 405 may be a peripheral device. It should be noted that with reference to FIG. 1 and FIG. 4, the peripheral device interface 403 in FIG. 4 may comprise the backlight driving component 103 and the display panel driving component 105 in FIG. 1.

The peripheral device interface 403 may be configured to connect at least one peripheral device associated with an I/O (Input/Output) to the processor 401 and the memory 402. In some embodiments, the processor 401, the memory 402 and the peripheral device interface 403 are integrated on the same chip or circuit board. In some other embodiments, any one or two of the processor 401, the memory 402 and the peripheral device interface 403 may be implemented on a single chip or circuit board, which is not limited in the present embodiment.

The radio frequency circuit 404 is configured to receive and transmit an RF (Radio Frequency) signal, which is also referred to as an electromagnetic signal. The radio frequency circuit 404 communicates with a communication network and other communication devices via the electromagnetic signal. The radio frequency circuit 404 converts the electrical signal into the electromagnetic signal for transmission, or converts the received electromagnetic signal into the electrical signal. Optionally, the radio frequency circuit 404 comprises an antenna system, an RF transceiver, one or more amplifiers, a tuner, an oscillator, a digital signal processor, a codec chipset, a subscriber identity module card, and the like. The radio frequency circuit 404 can communicate with other display devices via at least one wireless communication protocol. The wireless communication protocol comprises, but not limited to, the World Wide Web, a metropolitan area network, an intranet, various generations of mobile communication networks (2G, 3G, 4G, and 5G), a wireless local area network, and/or a Win (Wireless Fidelity) network. In some embodiments, the RF circuit 404 may further comprise NFC (Near Field Communication) related circuits, which is not limited in the present disclosure.

The display screen 405 is configured to display a UI (User Interface). The UI may comprise graphics, text, icons, videos, and any combination thereof. When the display screen 405 is a touch display screen, the display screen 405 further has the capacity to acquire touch signals on or over the surface of the display screen 405. The touch signal may be input into the processor 401 as a control signal for processing. At this time, the display screen 405 may also be configured to provide virtual buttons and/or virtual keyboards, which are also referred to as soft buttons and/or soft keyboards. In some embodiments, one display screen 405 may be disposed on the front panel of the display device 400. In some other embodiments, at least two display screens 405 may be disposed respectively on different surfaces of the display device 400 or in a folded design. The display screen 405 may be an LCD (liquid Crystal Display) screen.

The camera component 406 is configured to capture images or videos. In some embodiments of the present disclosure, the camera component 406 comprises a front camera and a rear camera. Usually, the front camera is placed on the front panel of the display device, and the rear camera is placed on the back of the display device. In some embodiments, at least two rear cameras are disposed, and are any one of a main camera, a depth-of-field camera, a wide-angle camera, and a telephoto camera respectively, so as to realize a background blurring function achieved by fusion of the main camera and the depth-of-field camera, panoramic shooting and VR (Virtual Reality) shooting functions achieved by fusion of the main camera and the wide-angle camera or other fusion shooting functions. In some embodiments, the camera component 406 may also comprise a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 407 may comprise a microphone and a speaker. The microphone is configured to collect sound waves of users and environments, and convert the sound waves into electrical signals which are input into the processor 401 for processing, or input into the RF circuit 404 for voice communication. For the purpose of stereo acquisition or noise reduction, there may be a plurality of microphones respectively disposed at different locations of the display device 400. The microphone may also be an array microphone or an omnidirectional acquisition microphone. The speaker is then configured to convert the electrical signals from the processor 401 or the radio frequency circuit 404 into the sound waves. The speaker may be a conventional film speaker or a piezoelectric ceramic speaker. When the speaker is the piezoelectric ceramic speaker, the electrical signal can be converted into not only human-audible sound waves but also sound waves which are inaudible to humans for the purpose of ranging and the like. In some embodiments, the audio circuit 407 may also comprise a headphone jack.

The positioning component 408 is configured to locate the current geographic location of the display device 400 to implement navigation or LBS (Location Based Service). The positioning component 408 may be a positioning component based on the American GPS (Global Positioning System), the Chinese Beidou system, the Russian Glonass system, or the EU Galileo system.

The power source 409 is configured to power up various components in the display device 400. The power source 409 may be alternating current source, direct current source, a disposable battery, or a rechargeable battery. When the power source 409 comprises the rechargeable battery, the rechargeable battery can be charged in a wired manner or a wireless manner. In the wired manner, the rechargeable battery is charged through a wired circuit, and in the wireless manner, the rechargeable battery is charged through a wireless coil. The rechargeable battery can further support the fast charging technology.

In some embodiments, the display device 400 also comprises one or more sensors 410. The one or more sensors 410 comprise, but not limited to, an acceleration sensor 411, a gyro sensor 412, a pressure sensor 413, a fingerprint sensor 414, an optical sensor 415 and a proximity sensor 416.

The acceleration sensor 411 may detect magnitudes of accelerations on three coordinate axes in a coordinate system established for the display device 400. For example, the acceleration sensor 411 may be configured to detect components of the gravity acceleration on the three coordinate axes. The processor 401 may control the touch display screen 405 to display a user interface in a horizontal view or a longitudinal view according to a gravity acceleration signal acquired by the acceleration sensor 411. The acceleration sensor 411 may further be configured to acquire motion data of a game or a user.

The gyro sensor 412 can detect a body direction and a rotation angle of the display device 400, and can cooperate with the acceleration sensor 411 to capture a 3D motion of the user on the display device 400. Based on the data acquired by the gyro sensor 412, the processor 401 can implement the following functions: motion sensing (such as changing the UI according to a user's tilt operation), image stabilization during shooting, game control and inertial navigation.

The pressure sensor 413 may be disposed on a side frame of the display device 400 and/or a lower layer of the touch display screen 405. When the pressure sensor 413 is disposed on the side frame of the display device 400, a user's holding signal to the display device 400 can be detected. The processor 401 can perform left-right hand recognition or quick operation according to the holding signal acquired by the pressure sensor 413. When the pressure sensor 413 is disposed on a lower layer of the touch display screen 405, the processor 401 controls an operable control on the UI according to a user's pressure operation on the touch display screen 405. The operable control comprises at least one of a button control, a scroll bar control, an icon control and a menu control.

The fingerprint sensor 414 is configured to collect a user's fingerprint. The processor 401 identifies the user's identity based on the fingerprint collected by the fingerprint sensor 414, or the fingerprint sensor 414 identifies the user's identity based on the collected fingerprint. When the user's identity is identified as trusted, the processor 401 authorizes the user to perform related sensitive operations, such as unlocking the screen, viewing encrypted information, downloading software, paying, and changing settings. The fingerprint sensor 414 may be provided on the front side, the back side, or the lateral side of the display device 400. When the display device 400 is provided with a physical button or a manufacturer's Logo, the fingerprint sensor 414 may be integrated with the physical button or the manufacturer's Logo.

The optical sensor 415 is configured to collect intensity of ambient light. In one embodiment, the processor 401 may control a display brightness of the touch display screen 405 according to the intensity of ambient light collected by the optical sensor 415, For example, when the intensity of ambient light is high, the display brightness of the touch display screen 405 is increased; and when the intensity of ambient light is low, the display brightness of the touch display screen 405 is decreased. In another embodiment, the processor 401 can also dynamically adjust shooting parameters of the camera component 406 according to the intensity of ambient light collected by the optical sensor 415.

The proximity sensor 416, also referred to as a distance sensor, is usually disposed on the front panel of the display device 400. The proximity sensor 416 is configured to capture a distance between the user and a front surface of the display device 400. In one embodiment, when the proximity sensor 416 detects that the distance between the user and the front surface of the display device 400 becomes gradually smaller, the processor 401 controls the touch display screen 405 to switch from an ON state to an OFF state. When it is detected that the distance between the user and the front surface of the display device 400 gradually increases, the processor 401 controls the touch display screen 405 to switch from the OFF state to the ON state.

It should be noted that the processor 401 in FIG. 4 may be the processing component 104 in FIG. 1. It will be understood by those skilled in the art that the structure illustrated in FIG. 4 does not constitute a limitation on the display device 400, and the processor may comprise more or less components than those illustrated, or combine some components or adopt different component arrangements.

An embodiment of the present disclosure further provides a non-temporary computer-readable storage medium comprising an instruction, such as a memory comprising an instruction. The above instruction may be executable by a processor to complete the above grayscale adjustment method. For example, the non-temporary computer-readable storage medium may be an ROM (Read-Only Memory), an RAM (Random Access Memory, a CD-ROM (Compact Disc Read-Only Memory), a magnetic tape, a floppy disk, an optical data storage device or the like.

An embodiment of the present disclosure further provides a computer program product comprising an instruction. A computer executes the above grayscale adjustment method when the computer program product comprising the instruction is operated on the computer.

It should be noted that the grayscale adjustment circuit provided by the foregoing embodiment is described only by taking division of all the functional modules during grayscale adjustment of pixels as an example for explanation. In practice, the above functions can be completed by the different functional modules as required. That is, the internal structure of the grayscale adjustment circuit is divided into different functional modules to finish all or part of the functions described above.

It should be noted that the method embodiments and the corresponding device embodiments of the present disclosure may be cross referenced, which is not limited in the embodiments of the present disclosure. The sequence of the steps in the method embodiments may be adjusted appropriately, and the steps may be deleted or added according to the situation. Within the technical scope disclosed in the present disclosure, any variations of the method easily derived by a person of ordinary skill in the art shall fall within the protection scope of the present disclosure, which is not repeated here.

The foregoing descriptions are merely exemplary embodiments of the present disclosure, and are not intended to limit the present disclosure. Within the spirit and principles of the disclosure, any modifications, equivalent substitutions, improvements, and etc, are within the protection scope of the present disclosure.

What is claimed is:

1. A grayscale adjustment method, applicable to a display device, wherein the display device comprises a backlight source and a display panel, the backlight source being configured to alternately emit light of a plurality of colors in a light-emitting cycle, the method comprising:

acquiring a pixel value of a target pixel point in an image to be displayed, wherein the pixel value has grayscale values of a plurality of color channels corresponding to the plurality of colors respectively, the target pixel point is any pixel point in the image to be displayed, and a target pixel of the display panel is configured to display the target pixel point;

determining a target display grayscale value of the target pixel when the backlight source emits light of a first color in the light-emitting cycle based on a current display grayscale value of the target pixel, a duration coefficient of the target pixel and a grayscale value of a first-color channel in the plurality of color channels of the target pixel point; and adjusting the current display grayscale value of the target pixel to the target display grayscale value when the backlight source emits light of the first color, such that a flux of light of the first color passing through the target pixel in the light-emitting cycle matches the grayscale value of the first-color channel of the target pixel point.

2. The method according to claim 1, wherein the duration coefficient is in a positive correlation with a duration in which the target pixel displays the first color with the current display grayscale value in the light-emitting cycle.

3. The method according to claim 1, wherein determining the target display grayscale value of the target pixel when the backlight source emits light of the first color in the light-emitting cycle based on the current display grayscale value of the target pixel, the duration coefficient of the target pixel and a grayscale value of the first-color channel in the plurality of color channels of the target pixel point comprises:

determining the target display grayscale value of the target pixel when the backlight source emits light of the first color in the light-emitting cycle based on a specified formula, wherein the specified formula is:

$$M = \frac{F - C * A}{1 - A},$$

in which M is the target display grayscale value, F is the grayscale value of the first-color channel, C is the current display grayscale value, A is the duration coefficient, the duration coefficient equals a ratio of a duration in which the target pixel displays the first color with the current display grayscale value in the light-emitting cycle to a total duration in which the backlight source emits light of the first color in the light-emitting cycle.

4. The method according to claim 3, wherein the display panel comprises m lines of pixels, where m is an integer greater than 1, the target pixel is any pixel in an $i^{th}$ line of pixels, where i is an integer and $1 \leq i \leq m$, a time at which display grayscale values of a first line of pixels are adjusted is the same as a time at which the backlight source starts to emit light of the first color; and the duration coefficient A satisfies the following formula:

$$A = \frac{i - 1}{m + a},$$

in which a equals a ratio of a first time interval to a second time interval, the first time interval equals to a time interval from an end of adjusting display grayscale values of an $m^{th}$ line of pixels when the backlight source emits light of the first color to a start of refreshing the display grayscale values of the first line of pixels when the backlight source emits light of a next color in one light-emitting cycle, the second time interval equals to a time interval between adjusting display grayscale values of two adjacent lines of pixels, and $a \geq 0$.

5. The method according to claim 1, wherein the plurality of colors comprise red, green and blue; and the backlight source comprises a red light-emitting unit, a green light-emitting unit and a blue light-emitting unit, the red light-emitting unit, the green light-emitting unit and the blue light-emitting unit emit light sequentially in the light-emitting cycle.

6. The method according to claim 1, wherein a refreshing cycle of the display device is an integer multiple of the light-emitting cycle.

7. The method according to claim 2, wherein a refreshing cycling of the display device is an integer multiple of the light-emitting cycle.

8. The method according to claim 1, wherein an initial display grayscale value of the target pixel is one of 0 and 255 after the display device is powered on.

9. The method according to claim 1, wherein the plurality of colors comprise red, green and blue, and the backlight source comprises a red light-emitting unit, a green light-emitting unit and a blue light-emitting unit, the red light-emitting unit, the green light-emitting unit and the blue light-emitting unit emit light sequentially in the light-emitting cycle;

the display panel comprises m lines of pixels, where m is an integer greater than 1; the target pixel is any pixel of an $i^{th}$ line of pixels, where i is an integer and $1 \leq i \leq m$; a time at which display grayscale values of a first line of pixels are adjusted is the same as a time at which the backlight source starts to emit light of the first color; and the duration coefficient A satisfies the following formula:

$$A = \frac{i-1}{m+a},$$

in which a equals a ratio of a first time interval to a second time interval, the first time interval equals to a time interval from an end of adjusting display grayscale values of an $m^{th}$ line of pixels when the backlight source emits light of the first color to a start of refreshing display grayscale values of the first line of pixels when the backlight source emits light of a next color in one light-emitting cycle, the second time interval equals to a time interval between adjusting display grayscale values of two adjacent lines of pixels, where a≥0;

a refreshing cycle of the display device is an integer multiple of the light-emitting cycle; and an initial display grayscale value of the target pixel is one of 0 and 255 after the display device is powered on.

10. A grayscale adjustment device applicable to a display device, wherein the display device comprises a backlight source and a display panel, the backlight source being configured to alternately emit light of a plurality of colors in a light-emitting cycle; the grayscale adjustment device comprising:

an acquiring circuit, configured to acquire a pixel value of a target pixel point in an image to be displayed, wherein the pixel value has grayscale values of a plurality of color channels corresponding to the plurality of colors respectively; and the target pixel point is any pixel point in the image to be displayed;

a determining circuit, configured to determine a target display grayscale value of the target pixel when the backlight source emits light of a first color in the light-emitting cycle based on a current display grayscale value of a target pixel in the display panel, a duration coefficient of the target pixel and a grayscale value of a first-color channel in the plurality of color channels of the target pixel point, wherein the target pixel is configured to display the target pixel point; and an adjusting circuit, configured to adjust the current display grayscale value of the target pixel to the target display grayscale value when the backlight source emits light of the first color in the light-emitting cycle, such that a flux of light of the first color passing through the target pixel in the light-emitting cycle matches the grayscale value of the first-color channel of the target pixel point.

11. The grayscale adjustment device according to claim 10, wherein the duration coefficient is in a positive correlation with a duration in which the target pixel displays the first color with the current display grayscale value in the light-emitting cycle.

12. The grayscale adjustment device according to claim 10, wherein the determining circuit is configured to:

determine the target display grayscale value of the target pixel when the backlight source emits light of the first color in the light-emitting cycle based on a specified formula, wherein the specified formula is:

$$M = \frac{F - C*A}{1 - A},$$

where M is the target display grayscale value, F is the grayscale value of the first-color channel, C is the current display grayscale value, A is the duration coefficient, the duration coefficient equals a ratio of a duration in which the target pixel displays the first color with the current display grayscale value in the light-emitting cycle to a total duration in which the backlight source emits light of the first color in the light-emitting cycle.

13. The grayscale adjustment device according to claim 12, wherein the display panel comprises m lines of pixels, where m is an integer greater than 1; the target pixel is a pixel in an $i^{th}$ line of pixels, where i is an integer and 1≤i≤m; a time at which display grayscale values of a first line of pixels are adjusted is the same as a time at which the backlight source starts to emit light of the first color; and the duration coefficient A satisfies the following formula:

$$A = \frac{i-1}{m+a},$$

where a equals a ratio of a first time interval to a second time interval, the first time interval equals to a time interval from an end of adjusting display grayscale values of an $m^{th}$ line of pixels when the backlight source emits light of the first color to a start of adjusting display grayscale values of the first line of pixels when the backlight source emits light of a next color in one light-emitting cycle, the second time interval equals to a time interval between adjusting display grayscale values of two adjacent lines of pixels, and a≥0.

14. The grayscale adjustment device according to claim 10, wherein a refreshing cycle of the display device is an integer multiple of the light-emitting cycle.

15. The grayscale adjustment device according to claim 11, wherein a refreshing cycling of the display device is an integer multiple of the light-emitting cycle.

16. The grayscale adjustment device according to claim 10, wherein an initial display grayscale value of the target pixel is one of 0 and 255 after the display device is powered on.

17. The grayscale adjustment device according to claim 10, wherein the display panel comprises m lines of pixels, where m is an integer greater than 1; the target pixel is a pixel in an $i^{th}$ line of pixels, where i is an integer and 1≤i≤m; a time at which display grayscale values of a first line of pixels are adjusted is same as a time at which the backlight source starts to emit light of the first color; and the duration coefficient A satisfies the following formula:

$$A = \frac{i-1}{m+a},$$

in which a equals a ratio of a first time interval to a second time interval, the first time interval equals to a time interval from an end of adjusting display grayscale values of an $m^{th}$ line of pixels when the backlight source emits light of the first color to a start of refreshing display grayscale values of the first line of pixels when the backlight source emits light of a next color in one light-emitting cycle, the second time interval equals to a time interval between adjusting of display grayscale values of two adjacent lines of pixels, and a≥0;

a refreshing cycle of the display device is an integer multiple of the light-emitting cycle; and an initial display grayscale value of the target pixel is one of 0 and 255 after the display device is powered on.

18. A display device, comprising a processor, a memory, a backlight source and a display panel, wherein the backlight source is configured to alternately emit light of a plurality of colors in a light-emitting cycle;

the memory is configured to store a computer program; and the processor is configured to execute the computer program stored in the memory to implement the grayscale adjustment method of claim 1.

19. A non-transitory computer-readable storage medium, wherein an instruction is stored in the computer-readable storage medium; and when the instruction is operated on a processing component, the processing component executes the grayscale adjustment method of claim 1.

* * * * *